US012542231B2

(12) United States Patent
Yen

(10) Patent No.: US 12,542,231 B2
(45) Date of Patent: Feb. 3, 2026

(54) INDUCTOR DEVICE

(71) Applicant: Realtek Semiconductor Corporation, Hsinchu (TW)

(72) Inventor: Hsiao-Tsung Yen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 937 days.

(21) Appl. No.: 17/659,839

(22) Filed: Apr. 19, 2022

(65) Prior Publication Data

US 2023/0138230 A1 May 4, 2023

(30) Foreign Application Priority Data

Oct. 29, 2021 (TW) ................................ 110140459

(51) Int. Cl.
*H01F 27/28* (2006.01)
*H01F 27/29* (2006.01)

(52) U.S. Cl.
CPC .................................. *H01F 27/29* (2013.01)

(58) Field of Classification Search
CPC ....................................................... H01F 27/29
USPC ......................................................... 336/225
See application file for complete search history.

(56) References Cited

U.S. PATENT DOCUMENTS 8,842,410 B2 9/2014 Chan
10,128,033 B2 11/2018 Yen et al.
2007/0052512 A1* 3/2007 Jeon ........................ H01F 21/12 336/200
2008/0129434 A1* 6/2008 Khajehpour ............ H01F 21/12 336/200
2011/0051308 A1* 3/2011 Chan ........................ H01F 21/12 361/268
2017/0237292 A1 8/2017 Jeong et al.
2019/0279809 A1 9/2019 Yen

FOREIGN PATENT DOCUMENTS

CN 1551252 A 12/2004
CN 102376414 A 3/2012
JP 2007-5498 A 1/2007
TW I748846 B 12/2021

* cited by examiner

*Primary Examiner* — Ronald Hinson
(74) *Attorney, Agent, or Firm* — CKC & Partners Co., LLC

(57) ABSTRACT

An inductor device is disclosed. The inductor device includes a first ring structure and a second ring structure. The second ring structure is disposed within the first ring structure and is paralleled to the first ring structure. The first ring structure and the second ring structure are selectively connected or unconnected.

6 Claims, 8 Drawing Sheets

800

INDUCTOR DEVICE

CROSS-REFERENCE TO RELATED APPLICATION

This application claims the priority benefit of TAIWAN Application serial no. 110140459, filed Oct. 29, 2021, the full disclosure of which is incorporated herein by reference.

FIELD OF INVENTION

The invention relates to a device. More particularly, the invention relates to an inductor device.

BACKGROUND

Various types of existing inductors have their advantages and disadvantages. For example, a spiral-type inductor has a high Q value and a large mutual inductance, but the mutual inductance and coupling occur between the coils. For the 8-shaped inductor, since the directions of the induced magnetic fields of the two coils are opposite, the coupling and mutual inductance occur on the coupled magnetic field of the other coil. In addition, the 8-shaped inductor occupies a large area in the device.

SUMMARY

An aspect of this disclosure is to provide an inductor device. The inductor device includes a first ring structure and a second ring structure. The second ring structure is disposed within the first ring structure and is paralleled to the first ring structure. The first ring structure and the second ring structure are selectively connected or unconnected.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
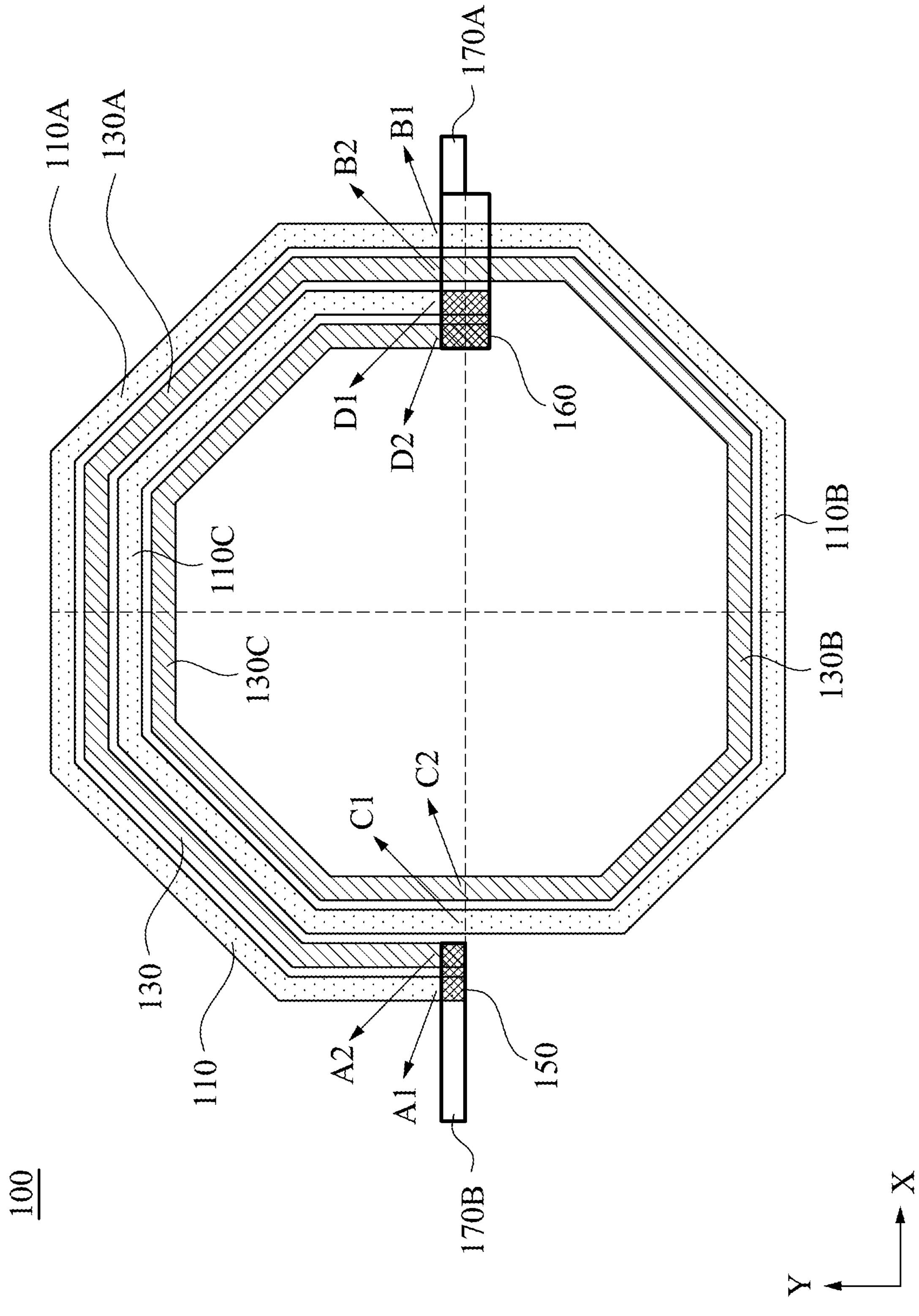
FIG. 1 is a schematic diagram illustrating an inductor device according to some embodiments of the present disclosure.

The following disclosure provides many different embodiments, or examples, for implementing different features of the invention. Specific examples of elements and arrangements are described lower than to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed lower than, or elsewhere in the specification, to provide additional guidance to the practitioner regarding the description of the invention.

The term "coupled" as used herein may also refer to "electrically coupled", and the term "connected" may also refer to "electrically connected". "Coupled" and "connected" may also refer to Refers to two or several elements cooperating or interacting with each other.

Reference is made to FIG. 1. FIG. 1 is a schematic diagram illustrating an inductor device 100 according to some embodiments of the present disclosure. The inductor device 100 includes a ring structure 110 and a ring structure 130. As shown in FIG. 1, structurally, the ring structure 130 is disposed within the ring structure 110. The ring structure 130 is paralleled to the ring structure 110. The ring structure 110 and the ring structure 130 are selectively connected or unconnected.

In detail, the inductor device 100 further includes the switch 150 and the switch 160. The switch 150 is coupled to end A1 of the ring structure 110 and end A2 of the ring structure 130. The switch 160 is coupled to end D1 of the ring structure 110 and end D2 of the ring structure 130.

When the switch 150 is conducted, end A1 of the ring structure 110 and end A2 of the ring structure 130 are connected through the switch 150. When the switch 160 is conducted, end D1 of the ring structure 110 and end D2 of the ring structure 130 are connected through the switch 160. In some embodiments, through the operation of the switch 150 and the switch 160, the ring structure 110 and the ring structure 130 can be selectively made to be connected or not connected.

The inductor device 100 in FIG. 1 further includes the feed points 170A and 170B. The feed point 170A is coupled to the end D1 of the ring structure 110. The feed point 170B is coupled to end A1 of the ring structure 110.

As illustrated in FIG. 1, the switch 150 and the switch 160 are both disposed on the X direction. In addition, the feed points 170A and 170B are also disposed on the X direction, but the embodiments of the present disclosure not limited thereto. In some other embodiments, the switch 150, the switch 160, the feed point 170A and the feed point 170B can be disposed in any direction.

The following will explain different conduction status of the switch 150 and the switch 160.

Figure 2:
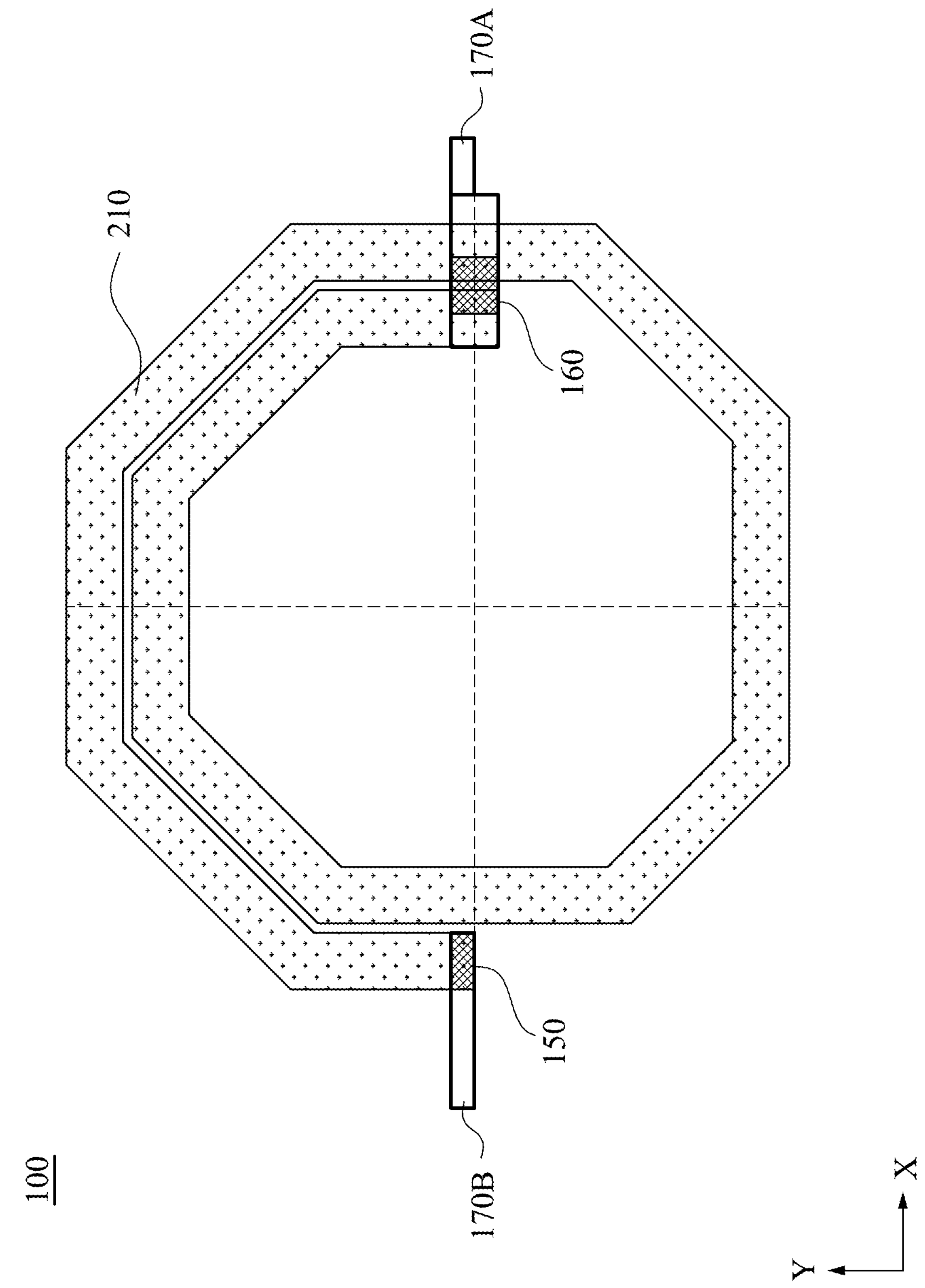
FIG. 2 is a schematic diagram illustrating an operation of the inductor device according to some embodiments of the present disclosure.
Figure 3:
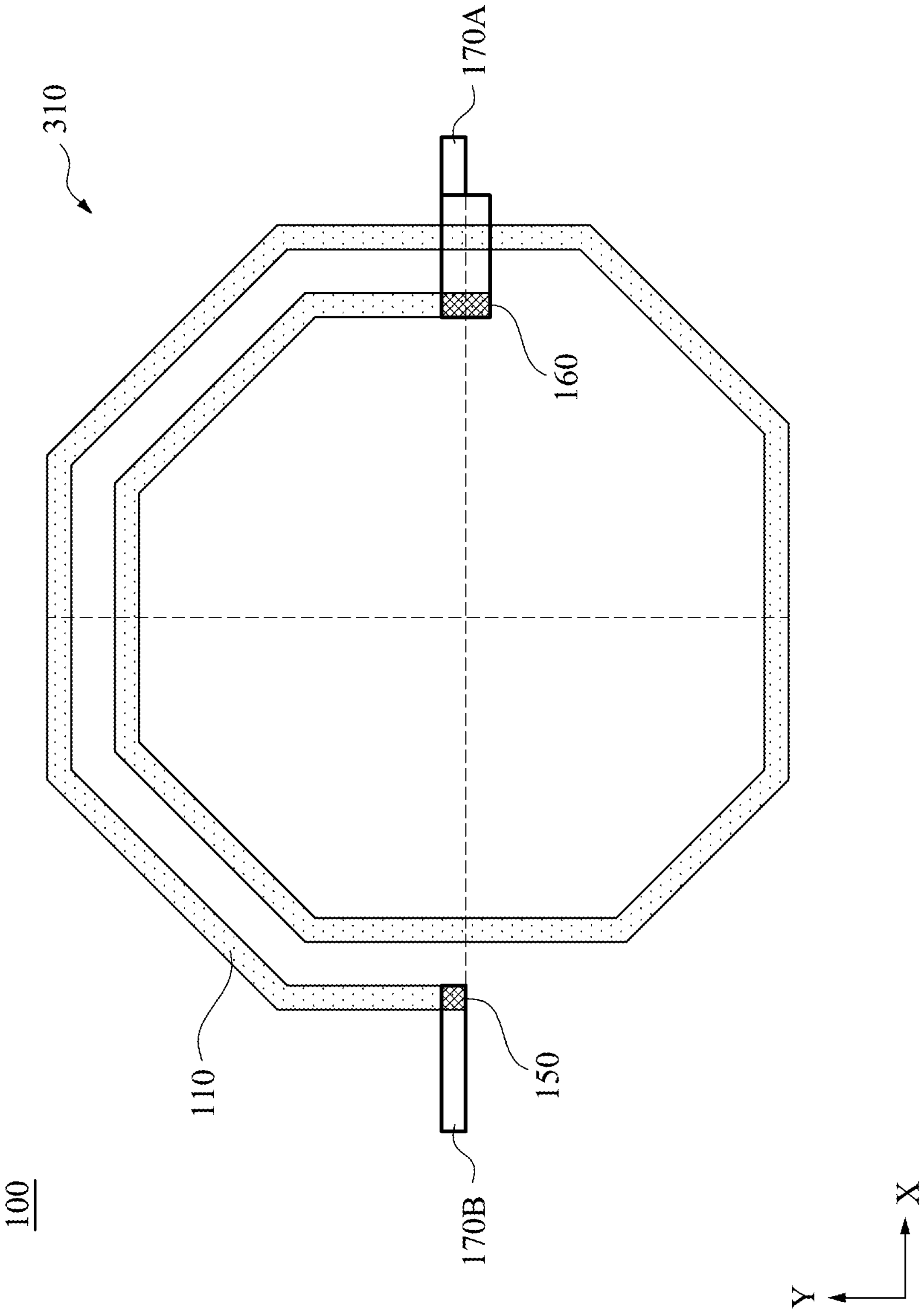
FIG. 3 is a schematic diagram illustrating another operation of the inductor device according to some embodiments of the present disclosure.

Reference is made to FIG. 2 and FIG. 3 at the same time. FIG. 2 is a schematic diagram illustrating an operation of the inductor device 100 according to some embodiments of the present disclosure. As illustrated in FIG. 2, when the switch 150 and the switch 160 in FIG. 1 are both conducted, the ring structure 110 and the ring structure 130 form an inductance element 210 together. FIG. 3 is a schematic diagram illustrating another operation of the inductor device 100 according to some embodiments of the present disclosure. As illustrated in FIG. 3, when neither switch 150 nor switch 160 in FIG. 1 is conducted, the ring structure 110 form an inductance element 310 by itself.

The width of the inductance element 210 in FIG. 2 is twice of the width of the inductance element 310 in FIG. 3, and the gap between each turn of the inductance element 310 in FIG. 3 is twice of the gap between each turn of the inductance element 210 in FIG. 2. In this way, in the embodiments of the present disclosure, different inductance values can be achieved by switching the switch 150 and the switch 160.

Reference is made to FIG. 1 again. In inductor device 100, the switch 150 and the switch 160 are included. In some other embodiments, the inductor device 100 may only include the switch 150 or only includes the switch 160. In some other embodiments, the inductor device 100 may include more switches connected to the ring structure 110 and the ring structure 130.

Figure 4:
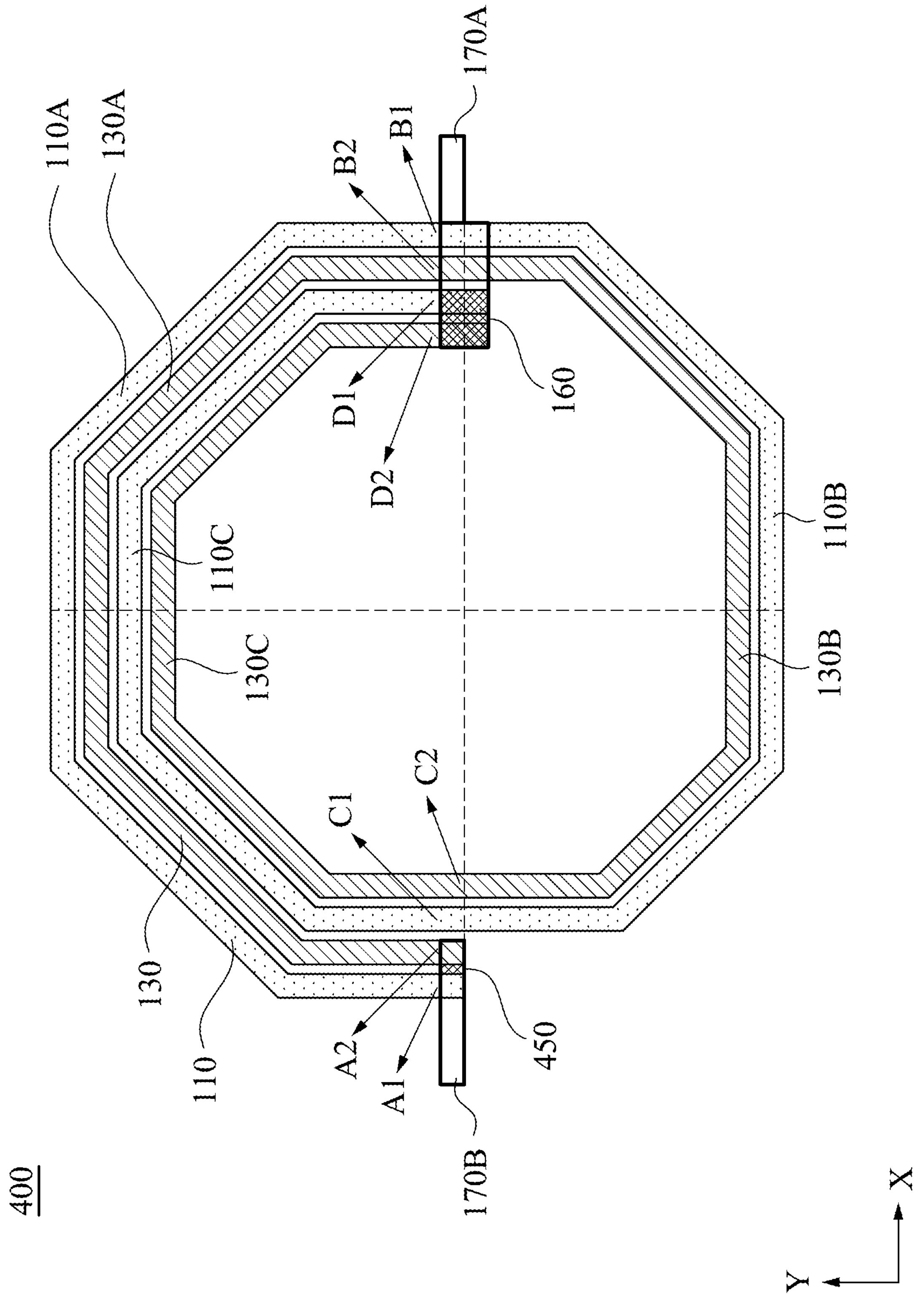
FIG. 4 is a schematic diagram illustrating another inductor device according to some embodiments of the present disclosure.

For example, reference is made to FIG. 4. FIG. 4 is a schematic diagram illustrating another inductor device 400 according to some embodiments of the present disclosure. In FIG. 4, end D1 of the ring structure 110 and end D2 of the ring structure 130 are connected through the switch 160, while end A1 of the ring structure 110 and end A2 of the ring structure 130 are connected directly or through the metal part 450. In the embodiments mentioned above, the width of the ring structure of the inductor device 100 or the gap between the ring structures can be changed by whether the switch 160 is conducted or not, so as to change the inductance value of the inductor device 100.

Figure 5:
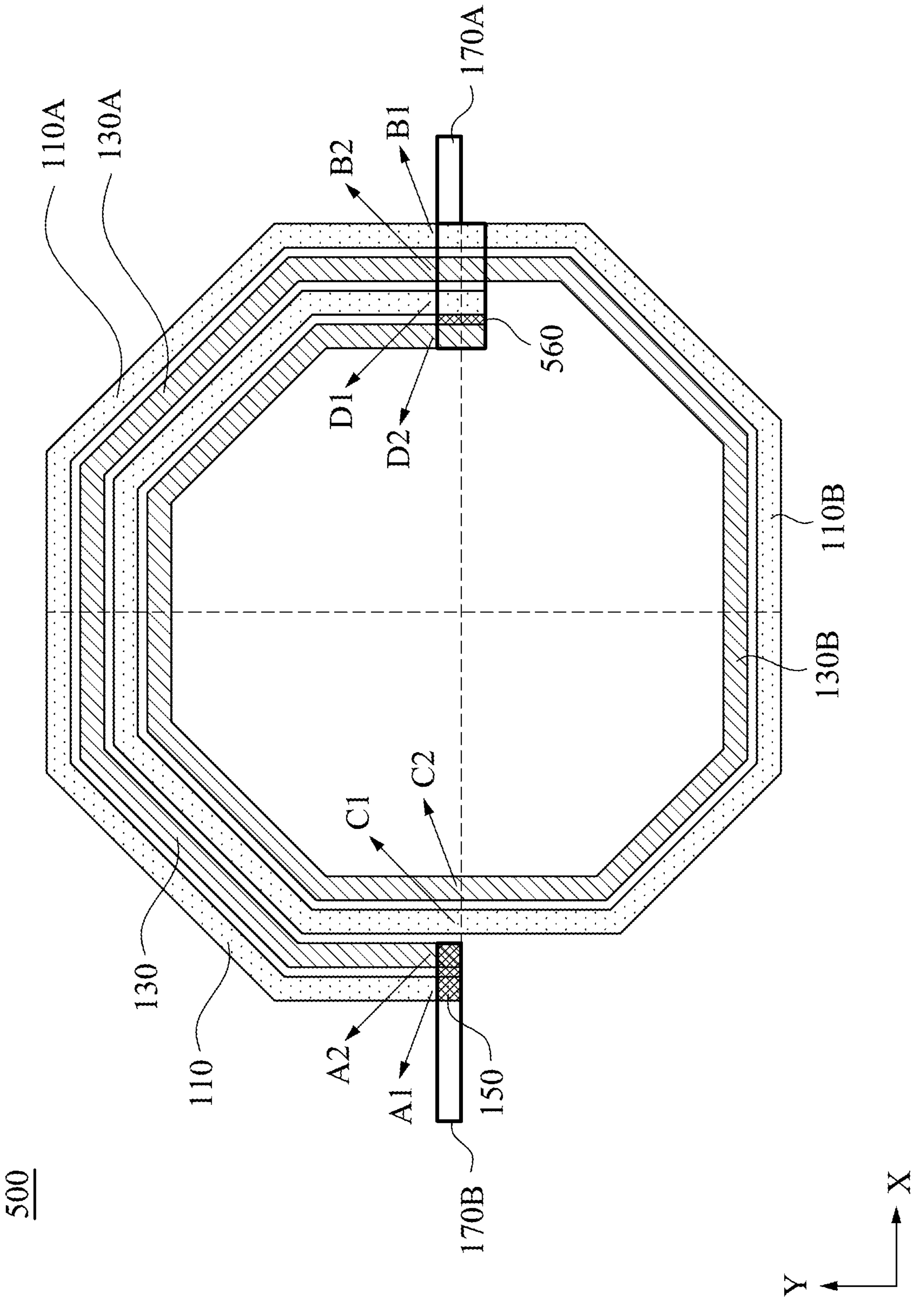
FIG. 5 is a schematic diagram illustrating another inductor device according to some embodiments of the present disclosure.

For another example, reference is made to FIG. 5. FIG. 5 is a schematic diagram illustrating another inductor device 500 according to some embodiments of the present disclosure. In FIG. 5, end A1 of the ring structure 110 and end A2 of the ring structure 130 are connected through the switch 150, while end D1 of the ring structure 110 and end D2 of the ring structure 130 are connected directly or through the metal part 560. In the embodiments mentioning above, the width of the ring structure of the inductor device 100 or the gap between the ring structures can be changed by whether the switch 150 is conducted or not, so as to change the inductance value of the inductor device 100.

In the embodiments of the present disclosure, the switch 150 and the switch 160 can be selectively connected to different positions of the ring structure 110 and the ring structure 130. The connection positions of the switch 150 and the switch 160 are not limited by the positions mentioning above.

Reference is made to FIG. 1 again. As shown in FIG. 1, the ring structure 110 includes a semicircular structure 110A from end A1 to end B1, a semicircular structure 110B from end B1 to end C1, and a semicircular structure 110C from end C1 to end D1. Likewise, the ring structure 130 includes a semicircular structure 130A from end A2 to end B2, a semicircular structure 130B from end B2 to end C2, and a semicircular structure 130C from end C2 to end D2.

The semicircular structure 110A is connected to the semicircular structure 110B, and the semicircular structure 110B is connected to the semicircular structure 110C. Similarly, the semicircular structure 130A is connected to the semicircular structure 130B, and the semicircular structure 130B is connected to the semicircular structure 130C. In addition, the semicircular structure 110A is paralleled to the semicircular structure 110C, and the semicircular structure 130A is paralleled to the semicircular structure 130C.

In the inductor device 100 as shown in FIG. 1, one end of the switch 150 is coupled to the end A1 of the semicircular structure 110A, and the other end of the switch 150 is coupled to the end A2 of the semicircular structure 130A. One end of the switch 160 is coupled to the end D1 of the semicircular structure 110C, and the other end of the switch 160 is coupled to the end D2 of the semicircular structure 130C.

Figure 6:
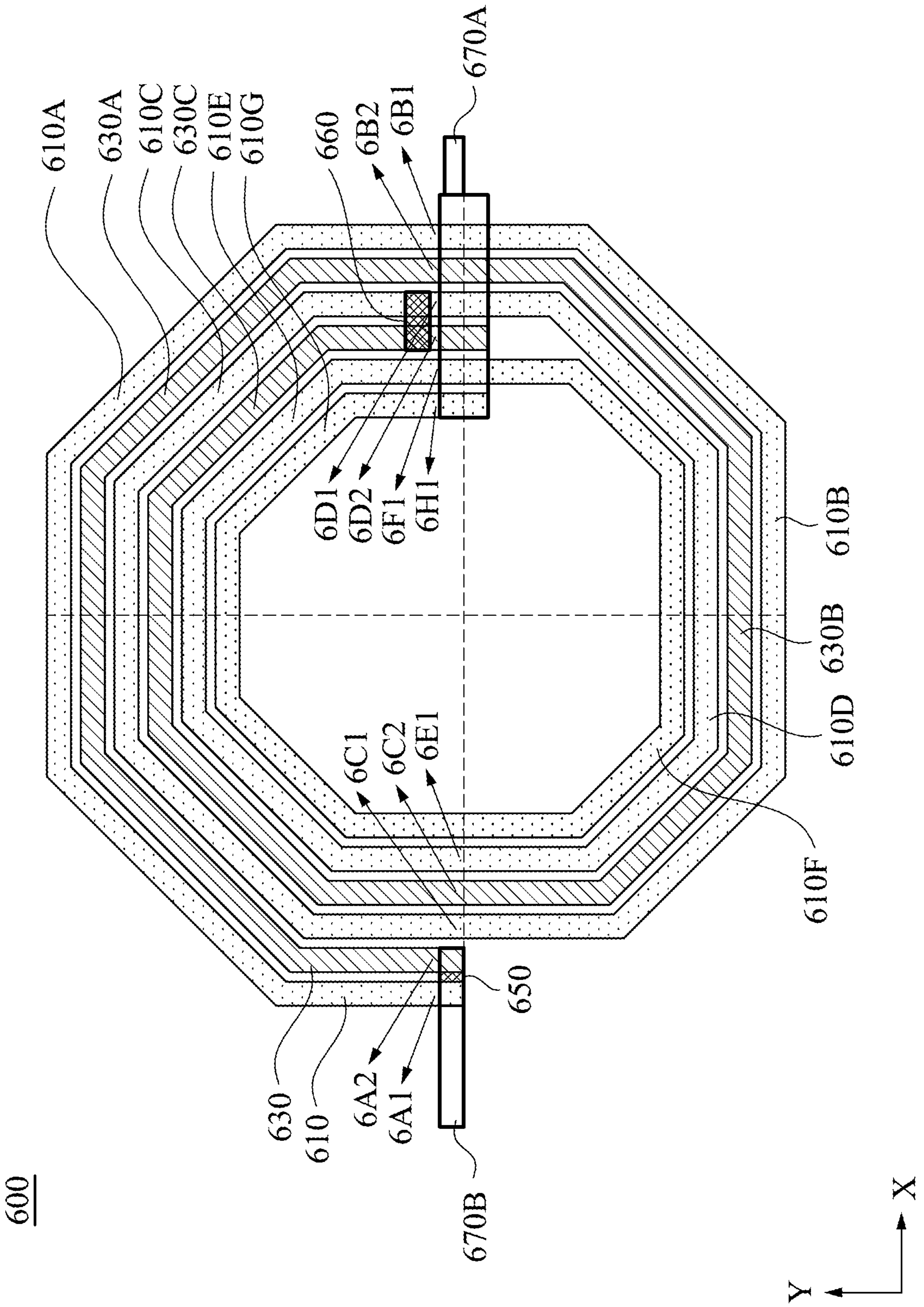
FIG. 6 is a schematic diagram illustrating another inductor device according to some embodiments of the present disclosure.

Reference is made to FIG. 6. FIG. 6 is a schematic diagram illustrating another inductor device 600 according to some embodiments of the present disclosure. As illustrated in FIG. 6, the ring structure 610 in FIG. 6 includes the semicircular structures 610A, 610B, 610C, 610D, 610E, 610F, and 610G. The semicircular structure 610A is connected to the semicircular structure 610B, the semicircular structure 610B is connected to the semicircular structure 610C, the semicircular structure 610C is connected to the semicircular structure 610D, the semicircular structure 610D is connected to the semicircular structure 610E, the semicircular structure 610E is connected to the semicircular structure 610F, and the semicircular structure 610F is connected to the semicircular structure 610G. The semicircular structure 610A, the semicircular structure 610C, and the semicircular structure 610E are paralleled to the semicircular structure 610G, and the semicircular structure 610B, the semicircular structure 610D are paralleled to the semicircular structure 610F. The semicircular structure 610A extends from end 6A1 to end 6B1, the semicircular structure 610B extends from end 6B1 to end 6C1, the semicircular structure 610C extends from end 6C1 to end 6D1, the semicircular structure 610D extends from end 6D1 to end 6E1, the semicircular structure 610E extends from end 6E1 to end 6F1, the semicircular structure 610F extends from end 6F1 to end 6G1, and the semicircular structure 610G extends from end 6G1 to end 6H1.

Furthermore, the ring structure 630 in FIG. 6 includes the semicircular structures 630A, 630B, and 630C. The semicircular structure 630A is connected to the semicircular structure 630B, and the semicircular structure 630B is connected to the semicircular structure 630C. The semicircular structure 630A and the semicircular structure 630C are paralleled. The semicircular structure 630A extends from end 6A2 to end 6B2, the semicircular structure 630B extends from end 6B2 to end 6C2, and the semicircular structure 630C extends from end 6C2 to end 6D2.

In FIG. 6, end 6A1 of the semicircular structure 610A and end 6A2 of the semicircular structure 630A are directly connected or are connected through the metal part 650. The inductor device 600 further includes the switch 660. One end of the switch 660 is connected to the end 6D1 of the semicircular structure 610C of the ring structure 610, and the other end of the switch 660 is connected to the end 6D2 of the semicircular structure 630C of the ring structure 630. In addition, FIG. 6 further includes the feed points 670A and 670B.

The number and connection method of the switches 660 shown in FIG. 6 are only used for illustration purpose, and the embodiments of the present disclosure are not limited thereto. The width of the ring structure of the inductor device 600 or the gap between the ring structures can be changed to change the inductance value of the inductor device 600 by whether the switch 660 is conducted or not.

Figure 7:
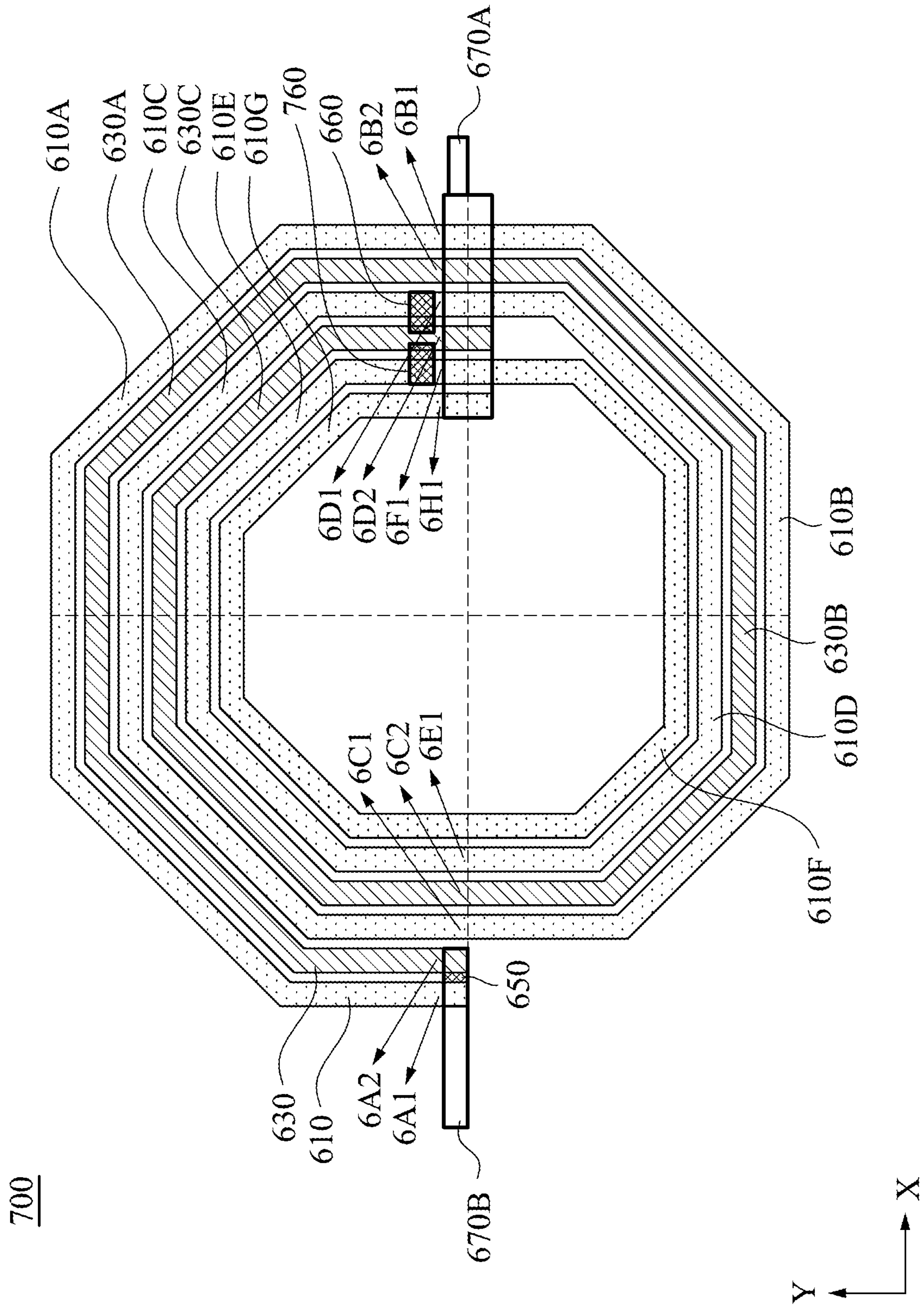
FIG. 7 is a schematic diagram illustrating another inductor device according to some embodiments of the present disclosure.

Reference is made to FIG. 7. FIG. 7 is a schematic diagram illustrating another inductor device 700 according to some embodiments of the present disclosure. The difference between the inductor device 700 illustrated in FIG. 7 and the inductor device 600 illustrated in FIG. 6 is that the inductor device 700 further includes a switch 760. One end of the switch 760 is connected to the end 6D2 of the semicircular structure 630C of the ring structure 630, and the other end of the switch 760 is connected to the end 6F1 of the semicircular structure 610E of the ring structure 610.

The number and connection method of the switch 660 and the switch 760 shown in FIG. 7 are only for illustration purpose only, and the embodiments of the present disclosure are not limited thereto. The width of the ring structure of the inductor device 700 or the gap between the ring structures can be changed to change the inductance value of the inductor device 700 by whether the switch 660 and the switch 760 are conducted or not. The switch 660 and the switch 760 can be conducted at the same time, or can be not conducted at the same time, one is conducted and another one is not conducted. In different conduction situations, the inductor device 700 includes different inductance values.

Reference is made to FIG. 4 again. The following will take switch 160 in FIG. 4 as an example to illustrate the connection between the switch and the ring structure. For example, in some embodiments, after the feed point 170 is pulled in by the cross-layer, a through hole is punched at end D1. The feed point 170 is connected to the switch 160 via the through hole on the end D1. The switch 160 is then connected to the end D2 on the bottom layer. The connection method of the other switches is similar to that of the switch 160, and will not be described in detail herein.

In the embodiments of the present disclosure, the ring structure can be an octagonal structure, but the embodiments of the present disclosure are not limited thereto. The ring structure can also be implemented by other polygonal structures, such as quadrilateral structures, hexagonal structures, etc.

It should be noted that, in the embodiments of the present disclosure, the switches 150 and 160 can be controlled together, or both can be a single-connected device, and can be controlled separately, depending on the actual requirements. Likewise, switches 660 and 670 can be controlled together, or both can be single-linked devices and can be controlled separately.

Figure 8:
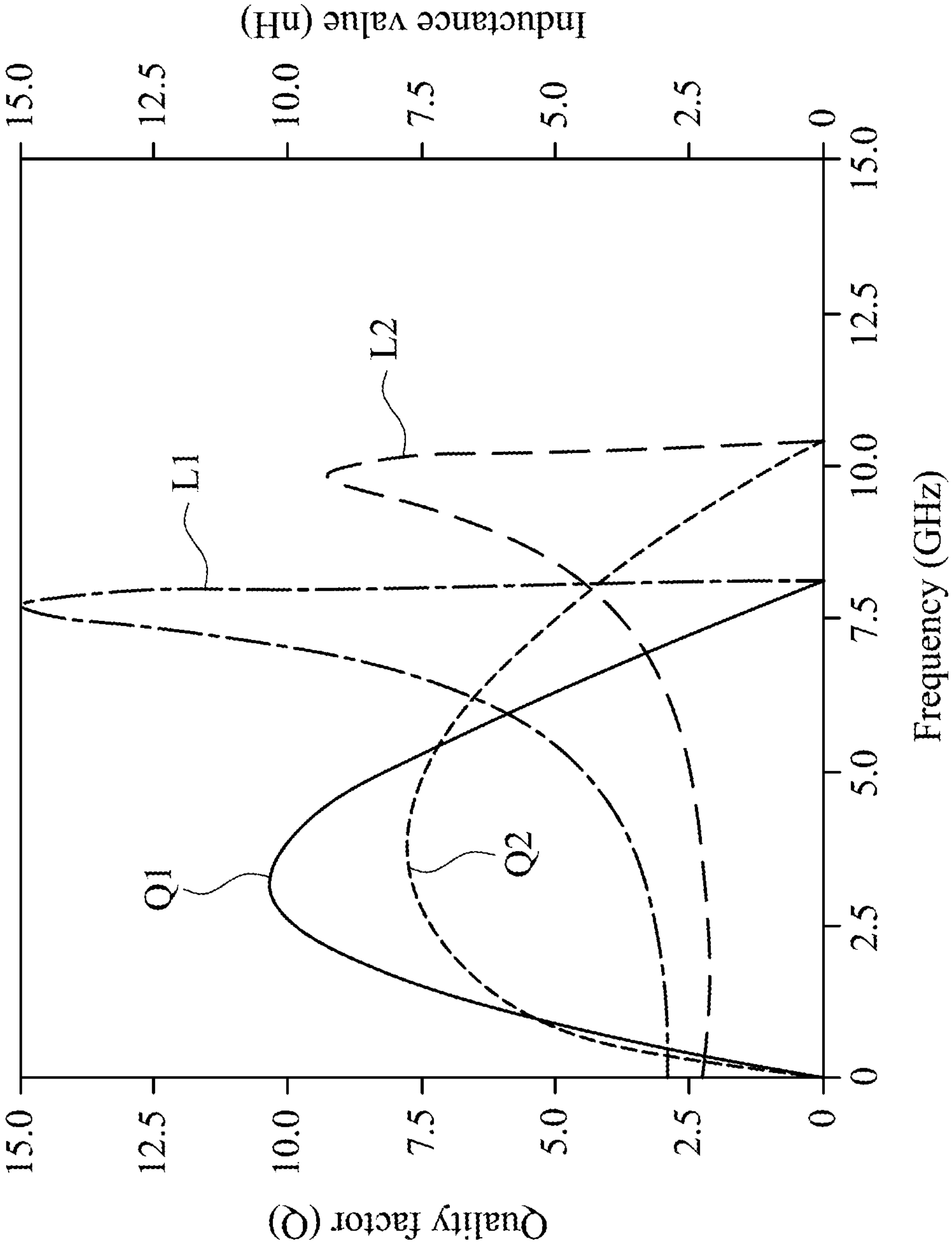
FIG. 8 is a schematic diagram illustrating an experimental data graph according to FIG. 4 according to some embodiments of the present disclosure.

Reference is made to FIG. 8. FIG. 8 is a schematic diagram illustrating an experimental data graph according to FIG. 4 according to some embodiments of the present disclosure. The curve L1 is the inductance value of the inductor device 400 when the switch 160 is not conducted, the curve Q1 is the Q (quality) value of inductor device 400 when the switch 160 is not conducted, the curve L2 is the inductance value of the inductor device 400 when the switch 160 is conducted, the curve Q1 is the Q (quality) value of the inductor device 400 when the switch 160 is conducted. As can be seen from FIG. 8, when the switch 160 is not conducted, the inductance value of the inductor device 400 is larger than that of inductor device 400 when the switch 160 is conducted, and the Q value of the inductor device 400 when the switch 160 is not conducted is higher the Q value of the inductor device 400 when the switch 160 is conducted. It can be seen from FIG. 8 that the inductance value and the Q value of the inductor device 400 can be changed by adjusting whether the switch 160 is conducted or not.

The inductor device of the embodiments can be operated by switches, so that the inductor device can provide different inductance values and Q values.

Various functional elements are disclosed herein. To those of ordinary skill in the art, functional elements may be implemented by electrical circuits, whether it is a dedicated circuit, or a general-purpose circuit operating under the control of one or several processors and coded instructions.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An inductor device, comprising:

a first ring structure; and a second ring structure, disposed within the first ring structure and paralleled to the first ring structure;

wherein the first ring structure and the second ring structure are selectively connected or unconnected, wherein the first ring structure comprises:

a first semi-octagonal structure;

a second semi-octagonal structure, connected to the first semi-octagonal structure;

a third semi-octagonal structure, connected to the second semi-octagonal structure, and paralleled to the first semi-octagonal structure;

a fourth semi-octagonal structure, connected to the third semi-octagonal structure, and paralleled to the second semi-octagonal structure; and a fifth semi-octagonal structure, connected to the fourth semi-octagonal structure, and paralleled to the third semi-octagonal structure;

wherein the second ring structure comprises:

a first semi-octagonal structure;

a second semi-octagonal structure, connected to the first semi-octagonal structure; and a third semi-octagonal structure, connected to the second semi-octagonal structure, and paralleled to the first semi-octagonal structure;

wherein the inductor device further comprises:

a first switch, wherein a first end of the first switch is coupled to a first end of the third semi-octagonal structure of the first ring structure, and a second end of the first switch is coupled to a first end of the third semi-octagonal structure of the second ring structure;

and a second switch, wherein a first end of the second switch is coupled to a first end of the fifth semi-octagonal structure of the first ring structure, and a second end of the second switch is coupled to the first end of the first semi-octagonal structure of the second ring structure.

2. The inductor device of claim 1, wherein when the first ring structure and the second ring structure are connected, the first ring structure and the second ring structure form a first inductance element together, wherein when the first ring structure and the second ring structure are not connected, the first ring structure forms a second inductance element by itself.

3. The inductor device of claim 1, wherein a first end of a first semi-octagonal structure of the first ring structure and a first end of a first semi-octagonal structure of the second ring structure are connected directly.

4. The inductor device of claim 1, wherein the first ring structure further comprises: a sixth semi-octagonal structure, connected to the fifth semi-octagonal structure, and is paralleled to the fourth semi-octagonal structure; and a seventh semi-octagonal structure, connected to the sixth semi-octagonal structure, and is paralleled to the fifth semi-octagonal structure.

5. The inductor device of claim 1, wherein both of the first switch and the second switch are located on a first direction.

6. The inductor device of claim 1, wherein the third semi-octagonal structure of the first ring structure is located within the first semi-octagonal structure of the first ring structure, and the third semi-octagonal structure of the second ring structure is located within the first semi-octagonal structure of the second ring structure, wherein a first end of the third semi-octagonal structure of the first ring structure and a first end of the third semi-octagonal structure of the second ring structure are connected through a switch, wherein a first end of the first semi-octagonal structure of the first ring structure and a first end of the first semi-octagonal structure of the second ring structure are connected directly.

* * * * *